United States Patent [19]
Ikeda et al.

[11] Patent Number: 4,965,114
[45] Date of Patent: Oct. 23, 1990

[54] OPTICAL RECORDING MEDIUM

[75] Inventors: Minoru Ikeda; Masaki Ishii; Hiroshi Ono; Koichi Saito, all of Kurashiki, Japan

[73] Assignee: Kuraray Company, Ltd., Kurashiki, Japan

[21] Appl. No.: 453,191

[22] Filed: Dec. 19, 1989

Related U.S. Application Data

[63] Continuation-in-part of Ser. No. 324,749, Mar. 17, 1989, abandoned.

[30] Foreign Application Priority Data

Mar. 18, 1988 [JP] Japan .................................. 63-66429

[51] Int. Cl.$^5$ .............................................. B32B 3/02
[52] U.S. Cl. ........................................ 428/64; 428/65; 428/207; 428/412; 428/421; 428/422; 428/457; 428/474.4; 428/480; 428/913; 346/76 L; 346/135.1; 369/275.1; 369/288

[58] Field of Search ................... 428/64, 65, 209, 412, 428/421, 422, 457, 474.4, 480, 913; 346/76 L, 135.1; 369/275, 288

[56] References Cited

U.S. PATENT DOCUMENTS 4,709,991 10/1987 Tokeoka et al. .................... 430/290

Primary Examiner—Patrick Ryan
Attorney, Agent, or Firm—Oblon, Spivak, McClelland, Maier & Neustadt

[57] ABSTRACT

An optical recording medium of a substrate and a thin metal film laminated thereon formed of a noble metal (A), a chalcogen (B) and bismuth (C) as essential components in amounts within the region of the phase diagram of FIG. 1 defined by the points: a; ($A_{80}B_{15}C_5$), b; ($A_{15}B_{80}C_5$), c; ($A_2B_{80}C_{18}$), d; ($A_2B_{49}C_{49}$) and e; ($A_{80}B_{10}C_{10}$), said medium capable of absorbing a laser beam of a specific wavelength region thereby recording information by the pits of cavities formed in the film by the laser beam.

13 Claims, 2 Drawing Sheets

OPTICAL RECORDING MEDIUM

This application is a continuation-in-part of application Ser. No. 07/324,749, filed on Mar. 17, 1989, now abandoned.

BACKGROUND OF THE INVENTION

1. Field of the Invention

The present invention relates to an optical recording medium for recording and reading information by means of a laser beam.

2. Description of the Background

Optical recording media which are used for the recording and reading of information by means of a laser beam have rapidly become practical because of the recent developments in the fundamental technology of semiconductor lasers, recording materials and film making processes, and also because of their ability to record a large amount of information. For an optical recording medium to be able to record information, a phase change leading to an optical change should take place in the portion of the medium struck with a laser beam. Bubble (pore) making, pitting (pit or cavity formation), and amorphous state-crystalline state transfer are some of the recording methods which have been proposed so far. For example techniques for recording media utilizing bubble making are disclosed in U.S. Pat. Nos. 4,300,227 and 4,404,656.

In the case of recording media which function by pit or cavity formation (hereinafter sometimes simply referred to as "pitting"), the chief type of medium employed is one which has a recording film consisting of a thin metal film comprising as its main component a chalcogen such as Te, Se, S, or the like. The techniques which are used to form the media are disclosed, e.g., in Japanese Patent Application Laid-Open Nos. 71193/1983, 110634/1977, 146691/1982, etc. However, since most of chalcogen elements are chemically unstable, the durability of media which utilize such elements is doubtful. Attempts have been made to improve such media by incorporating various additives therein, by providing protective films, or the like. Another improvement technique is a stabilization method which involves the formation of a solid solution with a stable compound such as Te-Se alloy or the like. Still another method involves the formation of an alkylate. However, these various methods which attempt to provide media of improved properties do not completely solve the problems of the media which utilize chalcogen elements in that their recording and reading characteristics decrease with time when the media are stored over a long period. In some cases, the reflectivity tends to change depending on the thickness of the recording film, and thus it is essential to strictly specify the thickness of the film.

Further, since the semiconductor laser has a better stability with time at lower output power, which power tends to deteriorate at higher outputs, high-sensitivity optical recording media are more preferred. From the point of view of the necessity of copying with high-speed and high-density recording, demands for recording media having higher sensitivity have increased.

SUMMARY OF THE INVENTION

Accordingly, one object of the present invention is, while solving the above-mentioned problems of the conventional optical recording media of the pitting type and providing a material with handling characteristics its conventional thin metal films, to provide an optical recording medium which possesses excellent durability and stability and which is capable of high-sensitivity recording.

Briefly, this object and other objects of the invention as hereinafter will become more readily apparent can be attained with a optical recording medium comprising a substrate and a thin metal film laminated thereon formed of a noble metal (A), a chalcogen (B) and bismuth (C) as essential components in amounts within the region of the phase diagram of FIG. 1 defined by the points a; $(A_{80}B_{15}C_5)$, b; $(A_{15}B_{80}C_5)$, c; $(A_2B_{80}C_{18})$, d; $(A_2B_{49}C_{49})$ and e: $(A_{80}B_{10}C_{10})$, said medium capable of absorbing a laser beam of a specific wavelength region thereby recording information by the pits or cavities formed in the film by the laser beam.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
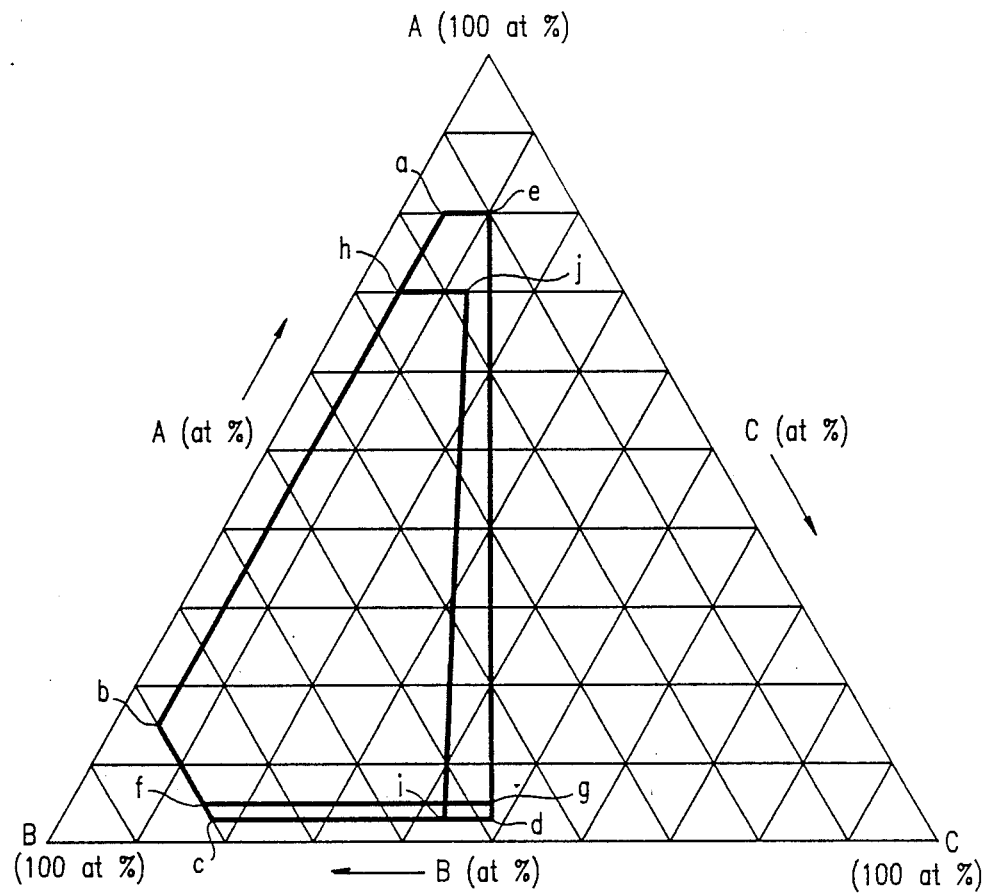
FIG. 1 is a triangular phase diagram showing the range of the composition of the thin metal film of the optical recording medium according to the present invention.

The optical recording medium of the present invention comprises a substrate and a thin metal film laminated on the substrate. The thin metal film is comprised of a noble metal (A), a chalcogen (B) and bismuth (C) and the amounts of these components in a given film are taken from the region surrounded by the points a, b, c, d and e, preferably from the region surrounded by the points a, b, e, f and g, or by the points b, c, h, i and j in the triangular phase diagram shown in FIG. 1, wherein the points represent the following compositions represented by the ratio of the number of atoms:

a: $(A_{80}B_{15}C_5)$
b: $(A_{15}B_{80}C_5)$
c: $(A_2B_{80}C_{18})$
d: $(A_2B_{49}C_{49})$
e: $(A_{80}B_{10}C_{10})$
f: $(A_5B_{80}C_{15})$
g: $(A_5B_{47.5}C_{47.5})$
h: $(A_{70}B_{25}C_5)$
i: $(A_2B_{54}C_{44})$
j: $(A_{70}B_{17}C_{13})$

By the implementation of the present invention, it is possible to obtain a stable optical recording medium capable of recording with high sensitivity and high CNR, when the thin metal film of the recording medium comprising a noble metal, a chalcogen and bismuth in a properly selected composition ratio.

The substrate of the present recording medium may be opaque, but preferably is transparent. The transparent substrate can be any material insofar as long as it transmits laser light beams. Suitable examples of such materials include transparent plastic resins such as polyester resins, polyolefin resins, polyamide resins, polycarbonate resins, polymethacrylate resins, and the like and inorganic materials such as glass.

The plastic substrates can be objects formed by such formation processes as calendering, injection molding, injection-compression molding, compression molding, photopolymer process (2P process) and/or the like. Further, the substrates may have a roughened surface, for example, a surface having guide tracks, which are known recording media.

In an embodiment of the invention, the thin metal film is formed of two-element crystalline compounds such as Te-Bi and Se-Bi with noble metals having high melting points but which do not favor the formation of pits or cavities. A thin metal film of sufficiently high stability and excellent recording characteristics can be obtained by appropriate selection of the amounts of the component elements. The reason for the high stability, in particular stability to oxidation of the recording medium is not clear but is believed to result from the partial conversion of excess chalcogen in the film to compounds with the noble metal, while the remainder of the chalcogen is dispersed in the amorphous state. It is therefore of fundamental importance that a noble metal be incorporated in the metal film in addition to the chalcogen and bismuth, in a specified amount.

Gold and platinum are the most preferred noble metals for the metal layer although other platinum elements such as ruthenium, rhodium, palladium, osmium and iridium may also be used. Suitable examples of the chalcogen used in the invention are selenium, tellurium and sulfur, among which selenium is most preferred because it has a particularly high stabilizing effect. These elements are used in specified amounts singly or in admixtures of more than two. Examples of representative combinations in the present invention are Au-Te-Bi, Pt-Te-Bi, Au-Se-Bi and Pt-Se-Bi.

In the present invention, if the noble metal is present in the film in too high an amount, the sensitivity of the recording medium obtained will be too low, and hence be of no practical value; while if the amount in the film is too low, the stability of the thin metal film will decrease, thereby causing gradual oxidation of the film.

Chalcogens are effective for increasing the recording sensitivity of the metal film obtained and also for stabilizing primarily bismuth. If, however, the chalcogens are present in too high amounts, the ability to absorb light will be insufficient, and the recording sensitivity will decrease, and further the stability of the metal film will decrease. On the other hand, if chalcogens are present in insufficient amounts, the bismuth will not fully be stabilized and will oxidize gradually.

Bismuth contributes to an increase in light absorptivity and improvement in the shape of pits formed in the recording medium. If bismuth is present in an amount exceeding the above specified range, it will oxidize gradually; while too little an amount of bismuth will create problems of insufficient light absorptivity and irregular pit shapes.

According to the present invention, not only writing is possible at the usual writing powers, but the rim is small, which effect had not been anticipated. This is very advantageous for improving the jitter characteristics of the medium.

In general, the reflectivity of optical recording media before recording, when irradiated with a laser light, is in the range of from 5 to 60%. If the reflectivity is too low, tracking will not be sufficient during recording and reading, and a stable recording and reading will hence be difficult. If the reflectivity is too high, the medium cannot sufficiently absorb the recording laser light and recording is impossible, or a high power is required for recording. Accordingly, the reflectivity before recording is preferably kept within the range of from 10 to 50%.

For the metal film layer to have a reflectivity within this range, the film thickness, though dependent on the type of elements incorporated, is generally 5 to 200 nm.

The thin metal film layer may be formed in the conventional way such as sputtering, vacuum deposition, ion plating and the like. The process employed is not a critical factor. For example, when the film is formed by sputtering, electric power is applied to targets made of each element which constitutes the metal film or to a target made of an alloy or conjugate thereof and is controlled in order to form a film having the desired composition.

The recording medium of the present invention can be provided with an optional intermediate layer interposed between the substrate and the thin metal film. Examples of materials for such an intermediate layer include fluorocarbon resins, nitrocellulose and polyimides. The provision of an intermediate layer is effective in further improving the recording sensitivity and CNR of the recording medium. Fluorocarbon resins and polyimides increase thermal resistance and decrease wettability, thereby facilitating formation of pits. The intermediate layer made of nitrocellulose works as the gas generating layer. Further the intermediate layer may be a metal reflective film. Such intermediate layers can be formed by processes suited for the material used such as spin coating, sputtering, vacuum deposition, or the like.

In the case where the intermediate layer in the present invention is a fluorocarbon resin layer, the ratio of the number of carbon atoms in the form of $CF_2$ and $CF_3$ groups to the total number of carbon atoms present in the fluorocarbon resin layer is preferably 45 to 65%, more preferably 45 to 55%. When the ratio is in the above range, the fluorocarbon resin layer is highly stable under conditions of high temperature and high humidity. If the ratio is above the range, the adhesion of the fluorocarbon resin layer will be low and the durability of the recording medium will therefore be poor, which is not preferred.

In the present invention, the above ratio is determined by analyzing the fluorocarbon resin layer by ESCA (Electron Spectroscopy for Chemical Analysis). In the present invention, ESCA was conducted with an ESCA-750 made by Shimadzu Corporation at 8 KV-30 mA of MgKα (1253.6 eV). Then, the $C_{1s}$ carbon atom profile of a plurality of peaks placed one upon another is subjected to waveform analysis, whereby the above $C_{1s}$ peak is divided into peaks having different $C_{1s}$-bond energies. Subsequent to peak division, the ratio of the number of carbon atoms in the form of $CF_2$ groups ($C_{1s}$ peak position; 291.6 ±0.3 eV) or $CF_3$ groups (ditto: 293.8 ±0.3 eV) to the number of total carbon atoms is determined. Here the position of the above $C_{1s}$ peak is one calculated when the $C_{1s}$ peak of the carbon-carbon bond is 285.0 eV.

The optical recording medium of the present invention may be protected from dust, the formation of cuts, and the like by applying a known protecting layer to either surface of the medium. The protecting layer may comprise optional synthetic resins such as polyurethanes, polyacrylics, silicone resins, phenol resins and melamine resins, or optional inorganic materials such as dielectrics.

The recording medium may be of any shape such as circular, rectangular, or the like; or disk-shaped, card-shaped or the like.

The optical recording media thus produced form, when irradiated with a laser beam, pits or cavities which are observed as permanent deformations of the thin metal film, thereby providing for the permanent recording of information.

The laser source to be used for recording and reading is not specifically limited; but a semiconductor laser is preferable to make the drive unit compact. The wavelength of the laser is preferably from about 750 to 850 nm. In this case the power for the recording laser is generally from about 1 to 10 mW.

Having generally described this invention, a further understanding can be obtained by reference to certain specific examples which are provided herein for purposes of illustration only and are not intended to be limiting unless otherwise specified.

EXAMPLES

The methods of determining stability and evaluating recording and reading characteristics are described as follows:

Evaluation of stability

Archival life and shelf life were evaluated by exposing a specimen in a atmosphere of 75° C and 85% RH for 1000 hours, and determining the recording and reading characteristics (CNR) before and after the exposure, using the following evaluation rating.

○ :no appreciable change at all in CNR
Δ:a slight change of not more than 5 dB in CNR
X:a CNR change exceeding 5 dB.

Resistance to oxidation was evaluated by immersing the specimen in a 3% aqueous $H_2O_2$ solution and measuring the reflectivity before and after the immersion, using the following evaluation rating.

○ :no appreciable change in reflectivity
Δ:a slight change of not more than 10% in reflectivity
X:a reflectivity change exceeding 10%.

Evaluation of recording and reading characteristics

Writing and reading were conducted under the following conditions to determine the minimum recording laser power required for forming pits and the highest CNR.

Writing condition: 1200 rpm, 1 MHz; duty: 30%; and recording power: 4 to 10 mW
Reading condition: reading power: 1 mW

EXAMPLE 1

A transparent plastic disc made of polycarbonate having an inside diameter of 15 mm, an outside diameter of 130 mm, and a thickness of 1.2 mm was made by injection molding. On the thus obtained disc, a recording film comprising Pt—Se—Bi was formed by sputtering. In the process, Pt—, Se—, and Bi-target or Pt-target and an Se-Bi-alloy target were used and the electric power applied to each of them was controlled in order to form films of the desired compositions. The vacuum initially attained was $5 \times 10^{-6}$ Torr and the Ar pressure during film formation was $5 \times 10^{-'}$ Torr.

The discs thus obtained were evaluated for various characteristics according to the above-described procedures. The results are shown in Table 1. From Table 1, it is understood that the recording media test No. 1 through No. 7 according to the present invention have good recording characteristics and sufficient CNR's, and have excellent stability.

On the other hand, for the recording medium of No. 10 (Reference Example), the reflectivity depends much more significantly on the film thickness than in the cases of media within the scope of the present invention, and it was difficult to control the film making conditions.

INSERT TABLE 1

TABLE 1

| Test Number | Present invention | | | | | | | Reference Example | | | |
|---|---|---|---|---|---|---|---|---|---|---|---|
| | 1 | 2 | 3 | 4 | 5 | 6 | 7 | 8 | 9 | 10 | 11 |
| Film Composition (ratio of the number of atoms) | | | | | | | | | | | |
| Pt | 3 | 10 | 25 | 30 | 70 | 10 | 40 | 0 | 0 | 0 | 20 |
| Se | 73 | 70 | 45 | 35 | 18 | 60 | 50 | 100 | 0 | 60 | 20 |
| Bi | 24 | 20 | 30 | 35 | 12 | 30 | 10 | 0 | 100 | 40 | 60 |
| Reflectivity (%) | 22 | 20 | 23 | 20 | 40 | 20 | 35 | 25 | 25 | 21 | 7 |
| Film thickness (Å) | 250 | 250 | 220 | 180 | 400 | 250 | 400 | 240 | 230 | 210 | 200 |
| Pit forming power (mW) | 5 | 5 | 7 | 7 | 9 | 6 | 8 | — | 5 | 10 | 7 |
| Maximum CNR (dB) | 52 | 52 | 47 | 48 | 48 | 52 | 50 | — | 45 | 49 | 51 |
| Stability | | | | | | | | | | | |
| Archival life | ○ | ○ | ○ | ○ | ○ | ○ | ○ | — | X | Δ | X |
| Shelf life | ○ | ○ | ○ | ○ | ○ | ○ | ○ | — | X | Δ | X |
| Resistance to Oxidation | ○ | ○ | ○ | ○ | ○ | ○ | ○ | X | X | ○ | X |
| Remarks | | | | | | | | Recording impossible | | | |

EXAMPLE 2

A recording film comprising Au—Te—Bi was formed by sputtering on a substrate similar to the procedure of Example 1. The sputtering was conducted in the same manner as described in Example 1 using Au—, Te— and Bi—targets or an Au—target and a Te—Bi alloy target and by controlling the electric power applied to each target, to prepare films having the specified compositions.

The discs thus obtained were evaluated in the same manner as described in Example 1, and the results obtained are shown in Table 2. From Table 2 it is obvious that the specimens of test Nos. 12 through 15 also have good recording characteristics and sufficiently high CNR's, and have excellent stability.

TABLE 2

| Test Number | Present invention | | | | Reference Example | | |
|---|---|---|---|---|---|---|---|
| | 12 | 13 | 14 | 15 | 16 | 17 | 18 |
| Film Composition (ratio of the number of atoms) | | | | | | | |
| Au | 5 | 20 | 2 | 52 | 5 | 0 | 90 |
| Te | 60 | 60 | 68 | 38 | 90 | 72 | 5 |
| Bi | 35 | 20 | 30 | 10 | 5 | 28 | 5 |
| Reflectivity (%) | 35 | 33 | 35 | 28 | 34 | 35 | 35 |
| Film thickness (Å) | 320 | 340 | 320 | 300 | 300 | 330 | 200 |
| Pit forming power (mW) | 6 | 7 | 6 | 8 | 6 | 6 | |
| Maximum CNR (dB) | 55 | 52 | 55 | 47 | 52 | 50 | |
| Stability | | | | | | | |
| Archival life | 0 | 0 | 0 | 0 | X | X | — |
| Shelf life | 0 | 0 | 0 | 0 | X | X | — |
| Resistance to oxidation | 0 | 0 | 0 | 0 | X | X | Δ |
| Remarks | | | | | | | Recording impossible | on a substrate having no intermediate layer by reactive sputtering using $CH_4$ gas and Te-target.

The recording media thus obtained were evaluated for recording characteristics and stability in the same manner as described in Example 1, and the results obtained are shown in Table 3. From Table 3, it is obvious that the recording media of the present invention have better recording characteristics than those with other recording media, and sufficient CNR's, and also exhibit excellent resistance to oxidation.

Figure 2:
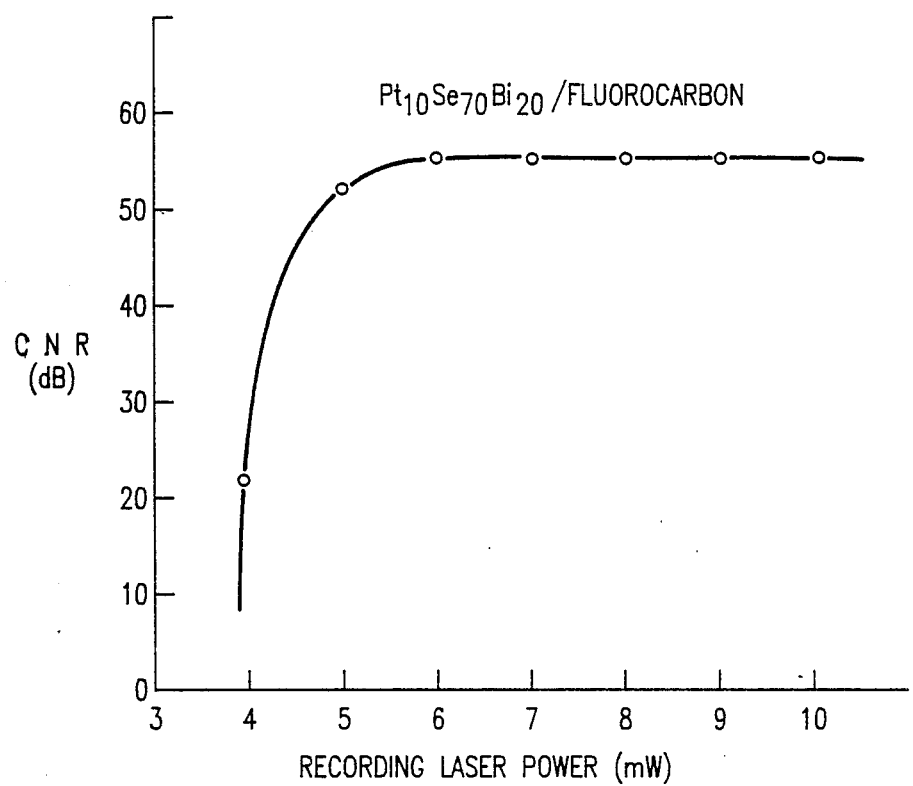
FIG. 2 is a diagram showing the relationship between the recording laser power and the carrier to noise ratio (CNR) measured on the optical recording medium obtained in Example of the present invention.

Recording on the recording medium of test No. 19 was performed while changing the recording laser power gradually from 1 to 10 mW, and the CNR was measured. The relationship between the power and the CNR is shown in FIG. 2. It is noted from FIG. 2 that with the recording medium of the present invention, recording over a wide range of power is possible.

TABLE 3

| Test Number | Present invention | | | | | Reference Examples | |
|---|---|---|---|---|---|---|---|
| | 19 | 20 | 21 | 22 | 23 | 24 | 25 |
| Metal Film | | | | | | | |
| Film Composition (ratio of the number of atoms) | $Pt_5Te_{60}Bi_{35}$ | $Au_5Te_{60}Bi_{35}$ | $Au_{20}Te_{60}Bi_{20}$ | $Au_{10}Se_{70}Bi_{20}$ | $Pt_{70}Se_{18}Bi_{12}$ | TeSePb | TeC |
| Film thickness (Å) | 330 | 320 | 340 | 200 | 400 | 270 | 350 |
| Intermediate Layer | | | | | | | |
| Material | FC | FC | FC | FC | NC | FC | — |
| Film thickness (Å) | 200 | 200 | 200 | 100 | 1000 | 100 | 350 |
| * | 49 | 47 | 53 | 51 | — | 49 | — |
| Reflectivity (%) | 35 | 35 | 33 | 20 | 40 | 31 | 32 |
| Pit forming power (mW) | 5 | 4 | 4 | 4 | 5 | 4 | 4 |
| Maximum CNR (dB) | 52 | 55 | 52 | 55 | 52 | 55 | 47 |
| Stability | | | | | | | |
| Archival life | 0 | 0 | 0 | 0 | 0 | 0 | Δ |
| Shelf life | 0 | 0 | 0 | 0 | 0 | 0 | Δ |
| Resistance to Oxidation | 0 | 0 | 0 | 0 | 0 | X | X |

*Ratio of the number of carbon atoms as $CF_2$ or $CF_3$ groups to the total number of carbon atoms present in the fluorocarbon resin layer.
FC: Fluorocarbon resin
NC: Nitrocellulose

EXAMPLE 3

The same substrate as that in Example 1 was provided with an intermediate layer comprising a fluorocarbon resin or nitrocellulose, and the recording characteristics of various recording films formed thereon were measured.

For the formation of the fluorocarbon intermediate layer, a polytetrafluoroethylene target was used, followed by sputtering; and the nitrocellulose intermediate layer was formed by spin coating. Recording films of Pt-Se-Bi and Au-Se-Bi were formed by sputtering in the same manner as described in Example 1 except for changing the target. In all cases, the vacuum initially attained was $5 \times 10^{-6}$ Torr and the Ar pressure during film formation was $5 \times 10^{-3}$ Torr.

A Te-Se-Pb recording film was 3-element vacuum-deposited on the substrate primed with a fluorocarbon resin on its surface. A Te-C recording film was formed

EXAMPLE 4

Substrates similar to that of Example 1 were provided with intermediate layers comprising fluorocarbon resins each having a different ratio of the number of carbon atoms in the form of $CF_2$ or $CF_3$ groups to the number of total carbon atoms present in the fluorocarbon resin layer. The intermediate layers were formed by sputtering, and the electric power for sputtering was changed in order to obtain layers having different ratios carbon atom number ratios. A recording film comprising $Pt_{10}Se_{70}B_{20}$ (ratio of the number of atoms) was provided on each of the intermediate layers. The degree of vacuum initially attained was $5 \times 10^{-6}$ Torr and the Ar pressure during film formation was $5 \times 10^{-3}$ Torr.

The recording characteristics and the stability of the recording media thus obtained were evaluated in the same manner as described in Example 1, and the results are shown in Table 4. As is obvious from Table 4, the recording characteristics are good for all the cases, and, in particular, the stability was excellent where the above ratio of carbon atoms present in the fluorocarbon intermediate layer is 45 to 65%.

TABLE 4

| Test Number | 26 | 27 | 28 | 29 |
|---|---|---|---|---|
| Metal Film | | | | |
| Film Composition (ratio of the number of atoms) | $Pt_{10}Se_{70}Bi_{20}$ | $Pt_{10}Se_{70}Bi_{20}$ | $Pt_{10}Se_{70}Bi_{20}$ | $Pt_{10}Se_{70}Bi_{20}$ |
| Film thickness (Å) | 230 | 230 | 230 | 230 |

TABLE 4-continued

| Test Number | 26 | 27 | 28 | 29 |
| --- | --- | --- | --- | --- |
| Intermediate Layer | | | | |
| Material | FC | FC | FC | FC |
| Film thickness (Å) | 250 | 150 | 250 | 150 |
| * | 54 | 49 | 31 | 70 |
| Reflectivity (%) | 20 | 20 | 20 | 20 |
| Pit forming power (mW) | 4 | 4 | 4 | 4 |
| Maximum CNR (dB) | 55 | 55 | 55 | 55 |
| Stability | | | | |
| Archival life | 0 | 0 | Δ | Δ |
| Shell life | 0 | 0 | Δ | Δ |
| Resistance to oxidation | 0 | 0 | Δ | Δ |

*Ratio of the number of carbon atoms as $CF_2$ or $CF_3$ groups to the total number of carbon atoms present in the fluorocarbon resin layer.
FC: Fluorocarbon resin Obviously, numerous modifications and variations of the present invention are possible in light of the above teachings. It is therefore to be understood that within the scope of the appended claims, the invention may be practiced otherwise than as specifically described herein.

What is claimed is:

1. An optical recording medium, comprising:
a substrate and a thin metal film laminated thereon having a thickness ranging from 5 nm to 200 nm and consisting essentially of a nobel metal (A), a chalcogen (B) and bismuth (C) as essential components in amounts specified by the region of the phase diagram of FIG. 1 defined by the points: a; ($A_{80}B_{15}C_5$), b: ($A_{15}B_{80}C_5$), c; ($A_2B_{80}C_{18}$), d; ($A_2b_{49}C_{49}$) and e; ($A_{80}B_{10}C_{10}$), said medium capable of absorbing a laser beam of a specific wavelength region thereby recording information by the pits or cavities formed in the film by the laser beam and said medium, when irradiated by laser light, having a reflectivity before the recording of information which is within the range of from 5 to 60%.

2. The optical recording medium according to claim 1, wherein in the composition of said thin metal film is within the region defined by the points a; ($A_{80}B_{15}C_5$), b; ($A_{15}B_{80}C_5$), e; ($H_{80}B_{10}C_{10}$), f; ($A_5B_{80}C_{15}$), and g; ($A_5B_{47.5}C_{47.5}$) shown in FIG. 1.

3. The optical recording medium according to claim 1, wherein the composition of said thin metal film is within the region defined by the points b: ($A_{15}B_{80}C_5$), c; ($A_2B_{80}C_{18}$), h; ($A_{70}B_{25}C_5$), i; ($A_2B_{54}C_{44}$) and j; ($A_{70}B_{17}C_{13}$) shown in FIG. 1.

4. The optical recording medium according to claim 1, wherein said noble metal is selected from the group consisting of gold, platinum, ruthenium, rhodium, palladium, osmium and iridium.

5. The optical recording medium according to claim 4, wherein said noble metal is gold or platinum.

6. The optical recording medium according to claim 1, wherein said chalcogen is selected from the group consisting of selenium, tellurium and sulfur.

7. The optical recording medium according to claim 6, wherein said chalcogen is selenium.

8. The optical recording medium according to claim 1, wherein an intermediate layer is provided between said thin metal film and said substrate.

9. The optical recording medium according to claim 8, wherein said intermediate layer is a fluorocarbon resin layer.

10. The optical recording medium according to claim 9, wherein the ratio of the number of carbon atoms in the form of $CF_2$ or $CF_3$ groups to the total number of carbon atoms in said fluorocarbon resin layer is 45 to 65%.

11. The optical recording medium according to claim 9, wherein the ratio of the number of carbon atoms in the form of $CF_2$ or $CF_3$ groups to the total number of carbon atoms in said fluorocarbon resin layer is 45 to 55%.

12. The optical recording medium according to claim 1, wherein said substrate is formed of a resin selected from the group consisting of polyester resins, polyolefin resins, polyamide resins, polycarbonate resins and polymethacrylate resins.

13. The optical recording medium according to claim 1, wherein said thin metal film is protected with a protecting layer.

* * * * *